United States Patent [19]

Hosokawa et al.

[11] 4,393,380
[45] Jul. 12, 1983

[54] LIQUID CRYSTAL DISPLAY SYSTEMS

[75] Inventors: Minoru Hosokawa; Masayuki Ikeda; Satoru Yazawa, all of Suwa, Japan

[73] Assignee: Kabushiki Kaisha Suwa Seikosha, Tokyo, Japan

[21] Appl. No.: 153,973

[22] Filed: May 28, 1980

[30] Foreign Application Priority Data

May 28, 1979 [JP] Japan .................................. 54-65914
May 28, 1979 [JP] Japan .................................. 54-65915

[51] Int. Cl.³ .............................................. G09G 3/36
[52] U.S. Cl. ..................................... 340/805; 340/719; 340/784; 350/334
[58] Field of Search ............... 340/805, 784, 765, 718, 340/719; 350/330, 331, 332, 333, 334, 336

[56] References Cited

U.S. PATENT DOCUMENTS

3,904,924  9/1975  Hilsum et al. .................... 340/719
4,233,603  11/1980  Castleberry ...................... 340/718
4,239,346  12/1980  Lloyd ............................... 340/719

Primary Examiner—Marshall M. Curtis
Attorney, Agent, or Firm—Blum, Kaplan, Friedman, Silberman & Beran

[57] ABSTRACT

A matrix liquid crystal display circuit operates on a level of AC voltage equal to the voltage required for DC drive. The circuit includes a selecting transistor connected to the picture element and a capacitor for each picture element of the matrix. The capacitor in each row connects to a common electrode and the transistor gates in each row connect to a common electrode. The voltage level of the common capacitor electrode is shifted periodically relative to a reference voltage in order to invert the image signal polarity across the picture element and produce an AC drive. Inverted image signals of similar voltage level are alternately sampled.

18 Claims, 11 Drawing Figures

LIQUID CRYSTAL DISPLAY SYSTEMS

BACKGROUND OF THE INVENTION

This invention relates generally to a liquid crystal display circuit of the matrix type and more particularly to a circuit for driving liquid crystals with a low alternately current voltage and having one of the electrodes for driving the liquid crystals in common for every picture element of an entire matrix screen. In display systems which utilize the electro-optical properties of various kinds of liquid crystals, the liquid crystal picture elements are generally driven by an alternating voltage because the elements have a short life when driven solely by a DC voltage. An AC drive is also used in order to maintain the quality of display, for example, the homogeneity of the displayed image. The liquid crystals are driven by an alternating current having an operating voltage which is approximately twice as high as the threshold voltage for a DC drive. In order to obtain a range of operating voltage which is approximately equal to the operating voltge used for a DC drive, it is necessary to invert the signal potentials applied to the two electrodes between which the liquid crystal materials is interposed in the known manner.

SUMMARY OF THE INVENTION

Generally speaking, in accordance with the invention, a liquid crystal display circuit of the matrix type especially suitable for energy conservation is provided. The matrix liquid crystal display circuit operates on a level of AC voltage equal to the voltage required for DC drive. The circuit includes a selecting transistor connected to the picture element and a capacitor for each picture element of the matrix. The capacitors in each row connect to a common electrode and the transistor gates in each row connect to a common electrode. The voltage level of the common capacitor electrode is shifted periodically relative to a reference voltage in order to invert the image signal polarity across the picture element and produce an AC drive. Inverted image signals of similar voltage level are alternately sampled.

Accordingly, it is an object of this invention to provide an improved liquid crystal display circuit operating on a level of AC voltage equal to the voltage required for DC drive.

Still further objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
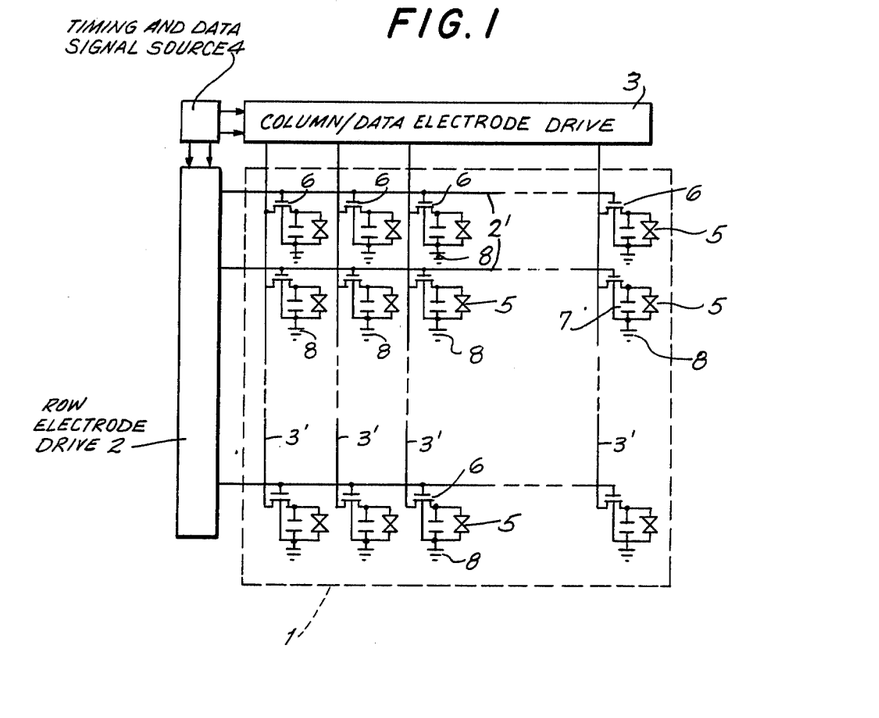
FIG. 1 is a conventional circuit arrangement for a matrix liquid crystal display unit.

FIG. 1 shows, by way of an example, a circuit arrangement for a matrix image display system of the type to which this invention pertains, and which includes transistors for selecting picture elements. A broken line surrounds a liquid crystal display unit 1 formed in a matrix. The circuit also includes peripheral components 2, 3, 4 as explained more fully hereinafter. The display includes a row electrode drive circuit 2, a column electrode or data electrode drive circuit 3, and a circuit 4 for supplying a timing signal and a data signal to the row and column drive circuits 2, 3 respectively. The timing and data signal generating unit 4 comprises a television receiver when the display unit 1 displays television images. When the display unit 1 is used as a character or graphic display, the functional block 4 is a central processing unit for processing the data to be displayed, or it is an interface between the central processing unit and the display unit.

The display unit 1 is provided with a plurality of liquid crystal display elements 5, each element 5 having an element selecting transistor 6 and a capacitor 7 connected thereto. There is a crystal display element 5 at each of the intersections between a plurality of row electrodes 2' and a plurality of column electrodes 3'. One liquid crystal element electrode is connected to the element selecting transistor 6 and to the capacitor 7. The other electrodes, that is disposed on the opposite side of the liquid crystal from the element electrode is, for every picture element 5, connected to a common potential ground (GND) 8. That is, the ground connections 8 define a common electrode throughout the entire display screen.

Figure 2:
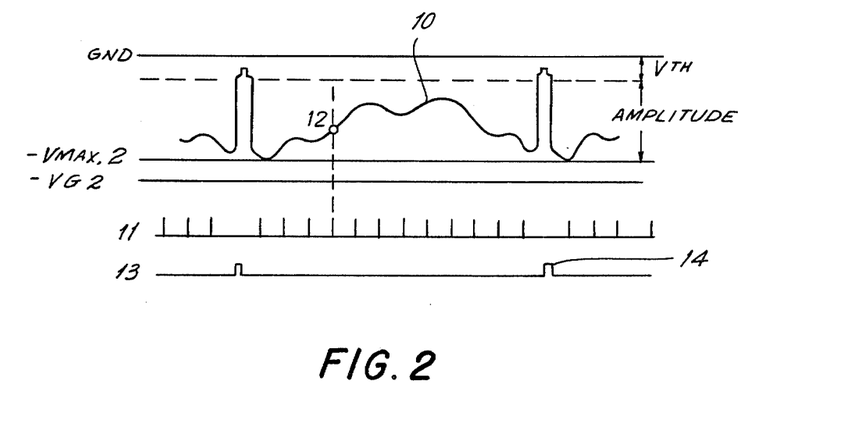
FIGS. 2 and 3 show the voltage potentials for AC and DC drive, respectively of liquid crystals of the circuit of FIG. 1.

In FIG. 1, as an example, the transistor 5 is a MOSFET and the common electrode potential (GND) coincides with the substrate potential of the transistor 6. As an example, and for ease of explanation, a video signal is used in a description of the operating potentials at various points of the circuit which are driven. The waveforms of FIG. 2 show an example for a DC drive system in which a common electrode potential for all of the liquid crystal elements 5 is connected at ground 8 as shown in FIG. 1. The waveform 10 is a video signal to be applied to the liquid crystal element electrodes, that is, to the non-grounded electrodes of the picture elements 5. A train of timing pulses 11 allows for the progressive sampling and holding of video signals for each column electrode 31 in the row electrode drive circuit 3 such that a signal 12, for example, is read and displayed by a particular element electrode. A train of timing pulses 13 enable the row electrode drive circuit 2 to turn on the element selecting transistors 6 in each row to thereby incorporate an image signal, sampled on a column electrode, into the picture element in the corresponding row. Thus a signal sampled at point 12 is applied to a picture element electrode by a pulse 14 as shown in waveform 13 of FIG. 2.

In FIG. 2, $V_{Th}$ indicates a liquid crystal display threshold voltage, and Vmax2 indicates the maximum image voltage applied to a liquid crystal in this example. At least a voltage of magnitude $V_G2$ is required for driving the liquid crystal display unit 1. This voltage $V_G2$ is applied to the gate of the elements selecting transistors 6 for switching of the transistors on and off. The voltage $V_G2$ is higher than Vmax2 by an amount which is equal to the threshold voltage for the transistor. This circuit and voltages described above are for a DC drive of the liquid crystal elements.

Figure 3:
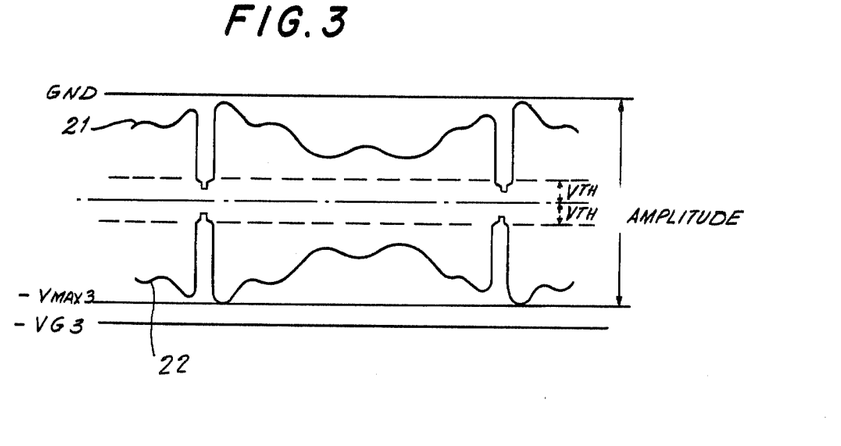

FIG. 3 illustrates potential levels for driving liquid crystals by an alternating current signal. In FIG. 3, the common electrode potential for the liquid crystals is not a ground potential, but is a potential setoff from ground as shown by the broken line 20. Therefore, a display unit using such a signal has a circuit diagram which is somewhat different from the circuit diagram of FIG. 1. Note that the common electrode potential 20 is substantially equal to the value of Vmax2 of FIG. 2. In FIG. 3, a video signal appears as a pair of generally symmetrical waveforms 21, 22 on both sides of the central common electrode potential 20. The waveform of FIG. 1 is symmetrically inverted in the known manner in the signal generating unit 4 or data drive circuit 3 to produce the signals of FIG. 3 when using an AC picture element drive. The waveforms are alternately furnished to each picture element at regular intervals in order to drive the liquid crystals by an alternating current signal. Accordingly, the video signal output has a maximum amplitude of Vmax3 which is a voltage approximately twice as large as that shown in FIG. 2. As seen in FIG. 3, the voltage for driving a display by AC is approximately twice as much as the voltage for DC drive as shown by the value $V_G3$.

The use of double the operating voltage in an AC circuit imposes more stringent requirements on the circuit components to withstand these voltages, more stringent provisions against leakage current, and other aspects of the circuit design are affected. The higher voltage increases the power consumption of the system. Simple calculations indicate that the requirement for electrical power is four times as great in the AC system as described above than in the DC system.

In view of the drawbacks of the conventional system as described above, the advantage of a liquid crystal display circuit in accordance with this invention is apparent. In accordance with this invention, the matrix display operates on an alternating current using an operating voltage which is equal to that which is required for a conventional DC drive. Thus, the advantages of an AC drive are achieved using the lower voltage of a DC system.

In a conventional system, in order to invert the polarity of signals applied to electrodes of a liquid crystal display system and enable driving by alternating current while using a voltage level equal to the voltage level required for DC drive, it is necessary that the electrodes positioned on the opposite side of the liquid crystals from the element electrodes should also be provided as individual separate electrodes for each picture element. That is, the opposite electrodes cannot be joined or define a common electrode for the entire screen as described above.

Thus, heretofore, in a system in which one of the sets of electrodes between which the liquid crystals are disposed defines a common electrode for the entire screen, either a direct current signal or an AC signal with twice the voltage was required.

Figure 4:
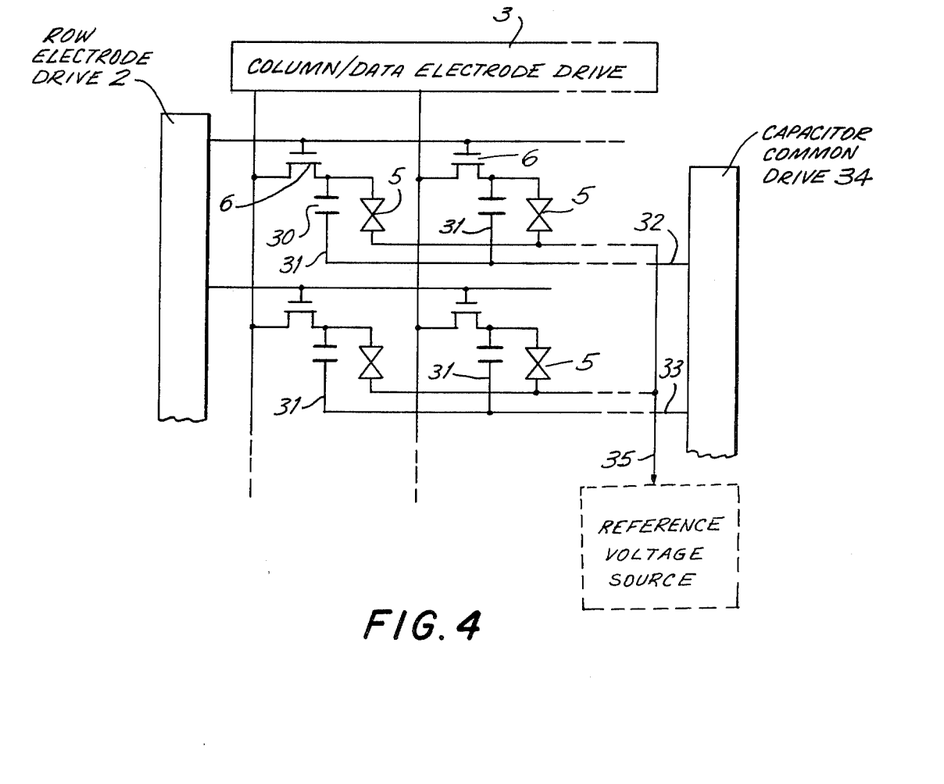
FIG. 4 is an AC drive circuit for a liquid crystal display unit in accordance with this invention.

The liquid crystal display circuit in accordance with this invention achieves an AC drive using a range of voltages hitherto employed for DC drive. This is accomplished by modifying the circuitry and without separating the common electrode of the picture elements, one by one or by rows. A superior display system is provided which eliminates the drawbacks of the previously described system. FIG. 4 shows an exemplary circuit of a matrix display unit in a liquid crystal display system in accordance with this invention.

The liquid crystal display element 5 is connected at one electrode to the drain of an element selecting transistor 6 and also to one terminal of a capacitor 30. A transistor 6 and capacitor 30 is provided for each display element 5. As in the circuit of FIG. 1, the other electrodes for the liquid crystal picture elements 5 are joined to a common electrode which services the entire screen. That is, one terminal of every picture element is connected to the common electrode 35. The other electrode 31 of the capacitors 30, that is, the electrode element of the capacitors 30 which is not connected to any electrode of the liquid crystal element 5, is separated from the substrate of the transistor 6, as opposed to the arrangement shown in FIG. 1. In each row, the capacitor electrodes 31 are connected with one another. A common capacitor electrode AC drive circuit 34 sets the potential of the common electrode 32, 33 and at levels required for the AC drive of the liquid crystals 5.

The means for driving the liquids crystals in a circuit arrangement as shown in FIG. 4 and using an AC signal is described hereinafter.

Figure 5:
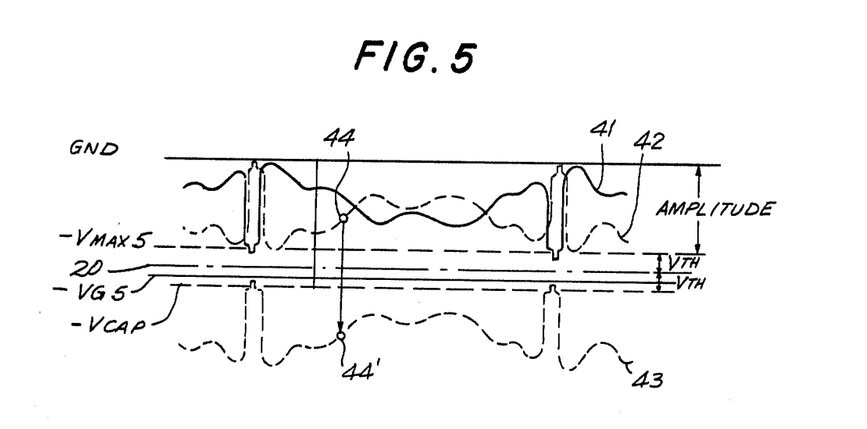
FIG. 5 shows operating voltage potentials for the circuit of FIG. 4.

FIG. 5 illustrates waveforms showing the voltage level of driving signals 41, 42 applied to the liquid crystal picture elements 5. These waveforms correspond to those of FIGS. 2 and 3 and show one conventionally inverted signal 42 in the same voltage range as the video signal 41. A common electrode potential 20 of the common electrode 35 for the liquid crystal display units 5 has the same value as the potential 20 shown in FIG. 3 and is equal in magnitude to Vmax2 in FIG. 2.

A voltage $V_G5$ is required for application as a signal to the gate of the element selecting transistor 6. The voltage $V_G5$ equals the sum of the amplitude of the video signal and the gate threshold voltage on the transistor 6, and can equal the value of $V_G2$ in FIG. 2 less the liquid crystal threshold voltage $V_{Th}$.

The voltage potential supplied by the common capacitor electrode AC drive circuit 34 to the common capacitor electrodes 32, 33 in turn, comprises two values shown at ground (GND) and $V_{CAP}$. The value of $V_{CAP}$ equals the sum of the common electrode potential 20 on the electrode 35 for the liquid crystal display elements 5, and a threshold voltage $V_{Th}$ of the liquid crystal itself. That is, $V_{CAP}$ is the sum of the values of Vmax2 and $V_{Th}$ in FIG. 2. The value of $V_{CAP}$ defines the maximum voltage required by the circuit of FIG. 4.

If the threshold voltage on the transistor 6 $|V$-$Max2-V_G2|$ and the value of $V_{Th}$ are equal to each other, for example, one volt, the maximum voltage $V_{CAP}$ required for driving the display system of this invention can equal the voltage $V_G2$ required for a conventional DC drive system as shown in FIG. 2. That is, half of the voltage required by the arrangement shown in FIG. 3 is sufficient. When a positive video signal 41 is applied to a picture element electrode as opposed to the common electrode for the liquid crystals, the common electrode 31 of the capacitor 30 in that row is held at GND or $V_{CAP}$ in turn, so that the video signal 41 is applied to the picture element electrode via the element selecting transistor 6. When, on the other hand, a negative video signal 42 is to be applied to the picture element electrode, the common electrode 31 of the capacitor 30 in the same row is held at the GND level until the video signal 42 is written on the picture element electrode through the element selecting transistor 6. Then immediately upon writing, the potential on the common electrode 31 is immediately lowered to the level of $-V_{CAP}$. Consequently, the potential level of the negative video signals applied to the picture element electrode in one row follows the waveform 43. The value of $V_{CAP}$ is, as already described, the sum of the common electrode potential 20 for the liquid crystal display unit and the value of $V_{Th}$. The negative video signal 43 and the positive video signal 41 applied to the liquid crystal element electrodes alternately are symmetrical to each other with respect to the common electrode potential 20 and thus are similar to the signals of FIG. 3.

When the capacitor 30 is designed with a sufficiently large capacity relative to the capacity defined by the liquid crystals 5, per se, the voltage across the two electrodes on the capacitor does not change even as the level of voltage potential on the electrode 31 is shifted. The capacity of the liquid crystals, per se, is the capacity between the common electrode 35 and the picture element electrode connected to the transistor 6. Therefore, when the level of potential on the electrode 31 is shifted from GND to $-V_{CAP}$, the voltage potential on the picture element electrode is shifted by an equal amount.

While the video signal 42, having an inverted polarity, is read by a picture element, the inverse signal is applied to the liquid crystal. However, as the time during which the inverse signal is applied in negligibly shorter than the frame period, it does not adversely affect the performance of the display system in accordance with this invention. The circuit of FIG. 4 is very simple and easy to produce.

Figure 6A:
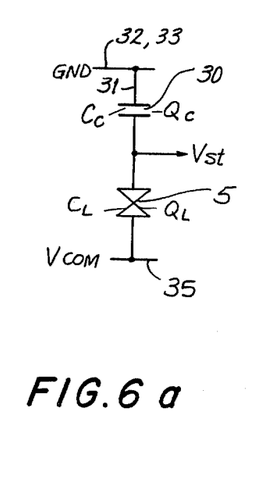
FIGS. 6a and 6b show variations in the voltage potentials on a liquid crystal picture element for AC drive.
Figure 6B:
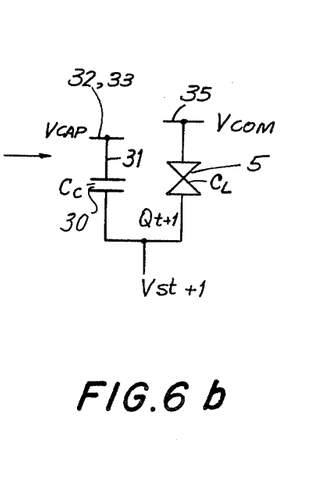

FIGS. 6a and 6b illustrate the changes in the level of potential applied to the capacitors 30 in greater detail. FIG. 6a shows the voltage potentials at various points on a capacitor 30 and the connected picture element 5 when the video signal 42 is applied to the picture element. At that time, one terminal of the capacitor 30 is connected to the ground potential. FIG. 6b shows the voltage potentials prevailing at various points of the network when the potential on the common electrode 31 of one row of the capacitors 30 has been lowered to $-V_{CAP}$. The voltage potential of the signal applied to the picture element in FIG. 6a is identified as $V_{st}$. The voltage potential of the picture element electrode after the change in potential on the capacitor electrode 31 is represented in FIG. 6b as $V_{st+1}$.

$$Q_C = V_{st} \cdot C_C$$
$$Q_L = (V_{COM} - V_{st}) \cdot C_L$$
$$Q_{t+1} = Q_C - Q_L$$
$$= C_C \cdot (V_{st+1} - V_{CAP}) + C_L \cdot (V_{st+1} - V_{COM})$$

Thus, $V_{st+1}$ can be represented as follows:

$$V_{st+1} = V_{st} + V_{CAP} - \frac{C_L}{C_C + C_L} \cdot V_{CAP}$$

If $C_C >> C_L$, the third term on the right side of the above equation is neglected, and the potential of the picture element electrode is shifted by an amount which would occur when the potential of the common capacitor electrode is lowered. Thus, a waveform 43 as shown in FIG. 5 is obtained. When the relation of $C_C >> C_L$ does not exist, the voltage corresponding to the third term can be superposed on the value of $V_{CAP}$, because the third term represents a fixed value.

Figure 7:
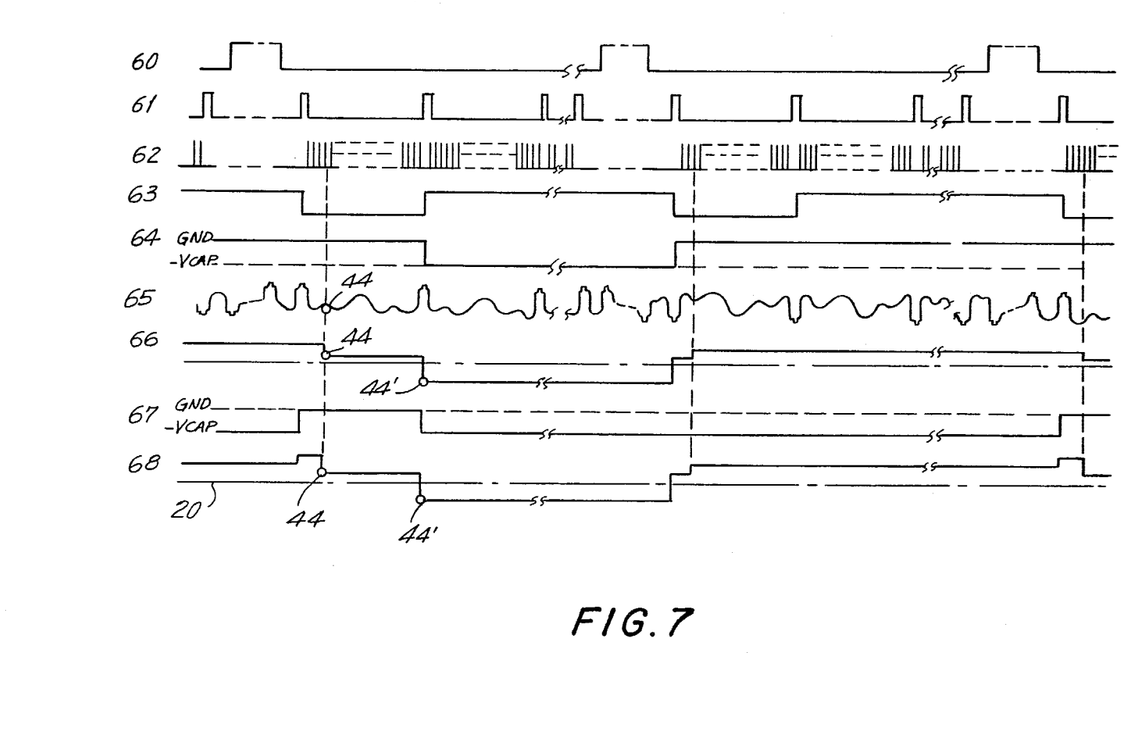
FIG. 7 is a timing chart of signals for a liquid crystal display unit in accordance with this invention.

FIG. 7 is a timing chart for TV video signals which are applied to picture elements in a liquid crystal matrix display unit using an AC drive circuit in accordance with this invention. The waveforms include a vertical synchronizing signal 60 and a horizontal synchronizing 61. A train of timing pulses 62 are used in the column electrode 3' drive circuit 3 for sampling a video signal for each column electrode. There is one pulse 62 for each column electrode in a single horizontal scanning line or row in the matrix display unit. Although no description has yet been made as to row electrode drive signals, it is usual to treat them as being equal to the horizontal synchronizing signals 61, so that in each row, a train of sampling pulses 62 samples a video signal for a corresponding column electrode, and a pulse 61 inputs the sampled video signal to each picture element electrode of the picture element 5 through a transistor 6.

The AC drive of liquid crystals, in accordance with this invention, also enables the use of the same row electrode drive circuits and time pulses as have been used previously. However, in accordance with this invention, the video signals are inputted to the picture elements electrodes more accurately because a short circuit is defined between a column electrode 3' and a picture element electrode by means of the element selecting transistor 6. This short circuit is provided while the column electrode drive circuit 3 is sampling a video sample with the samples corresponding to each picture element in a particular row. A waveform 63 represents the timing cycle for short circuiting each element selecting transistor 6 in a particular row.

Writing of a video signal into the picture elements has hitherto been accomplished by two steps of operation, namely, sampling of the video signals progressively by the column electrode drive circuit 3, and then after sampling, inputting the sampled signals to all the picture element electrodes in one row simultaneously. Thus, some of the samples are delayed before they are displayed. In accordance with this invention, a video signal is directly transmitted to a picture element electrode simultaneously with the sampling of the signal by the column electrode drive circuit 3, such that an accurate signal is inputted to the picture element electrode. Timing waveform 64 represents the inversion of voltage potential on the common capacitor electrode for each row. It should be understood that waveform 64 is used when the picture element selecting transistor 6 is a P-channel metal oxide semiconductor field effect transistor or similar. The polarity of the signal is reversed if an N-channel transistor is used.

The video signal 65 has its polarity inverted in a known vertical synchronizing signal circuit or a vertical interval circuit (not shown). Regarding the level of the video signal pair, both of the video signals have mutually opposite polarity and an amplitude of approximate equality. The video signal 65 is applied to the liquid crystal picture elements, and the liquid crystal driving video signal has an AC waveform with respect to the potential 20 which is on the common electrode 35 of the liquid crystal display unit as describe above. The signal potentials at points 44 and 44' on the waveforms of FIG. 7 correspond to those potentials at points 44 and 44' in FIG. 5.

A waveform 67 presents another example of potential inversion for use on the common capacitor electrode for each row. Using the waveform 67, the capacitor electrode in each row is usually at a low potential ($-V_{CAP}$), and is raised to a high potential (ground) in accordance with every other row electrode driving pulse 63. The potential of waveform 67 has the same time duration as the driving pulse 63. That is, only for a period when a video signal corresponding to all the picture elements in a picture row is being inputted to the picture elements. Consequently, the signals applied to the liquid crystal picture elements have the waveform 68, and the liquid crystals are driven by an alternating current.

When an image signal is inputted, a different signal from the video signal is also applied. This signal is transmitted to the picture element liquid crystal during a period corresponding to one horizontal scanning line of the video signal, but this signal has no effect on the display because it lasts for only a very small part of one frame. This is too short a time for the liquid crystal display to follow. Note that the waveform 67 is used when a P-channel transistor is used, and when an N-channel transistor is used, the polarity of the signal is reversed.

Figure 8:
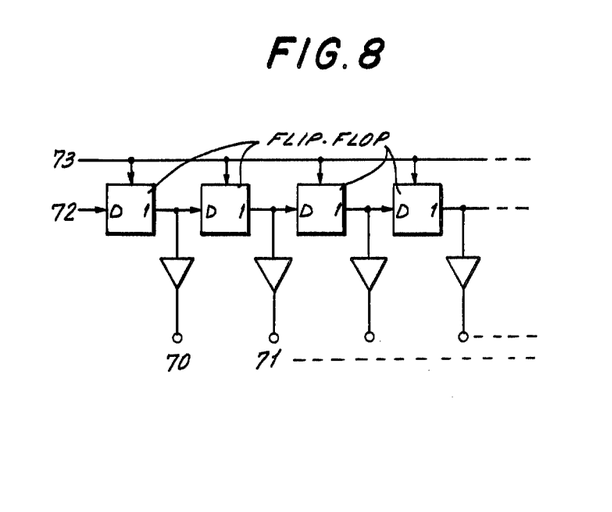
FIGS. 8 and 9 are circuits for driving common capacitor electrodes.

FIG. 8 is a circuit drawing of the capacitor electrode drive circuit 34 shown as a functional block in FIG. 4. Terminals 70, 71 are outputs for driving the common capacitor electrodes of each row. The outputs at the terminals 70, 71 have a waveform corresponding to waveform 64 in FIG. 7. The output waveform appears progressively at each row with a delay equal to the period of a horizontal scanning line. A clock pulse input 73 shifts the data for each horizontal scanning line and the potential input data 72 is fed to the delay flip-flops connected in series. The waveform of the output signal for the terminal 70 is inverted for each frame period, and the potential is shifted from a high level to a low level immediately after inputting a video signal in the corresponding row, and from a low to a high level immediately before such inputting. As previously noted, these shifts occur only when a P-channel transistor is used for the picture element selection transistor 6. If the timing of the inversion is changed, the image signal leaks out through the P-N junction in the drain of the transistor into its substrate, thereby disabling the proper display of the image.

Figure 9:
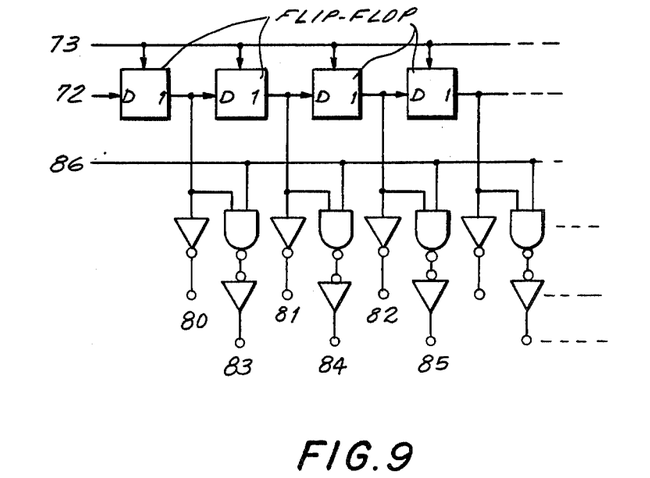

FIG. 9 is another example of a capacitor electrode drive circuit in accordance with this invention. The circuit shown in FIG. 9 combines the row electrode drive circuit 2 and the capacitor drive circuit 34 of FIG. 4. Each delayed flip-flop has two output terminals, that is, a direct output similar to that in FIG. 8 and an output through a gate circuit 88. Direct outputs 80, 81, 82 define row electrode driving signals, and outputs 83, 84, 85 through the gates 88 define capacitor electrode driving signals. An alternating signal 86, which is inverted for each frame, is applied to the other input terminal of the gates 88. As a result, a capacitor electrode driving output pulse is delivered from the NAND gates 88 for every other frame. An output signal from the terminal 83 is shown at waveform 67 in FIG. 7. This shift register circuit is used as stated above in common for the row electrode drive circuit 2 and for the capacitor electrode drive circuit 34, thereby enabling substantial savings in circuit components. As a result, the AC drive circuit in accordance with this invention is easy to produce.

Figure 10:
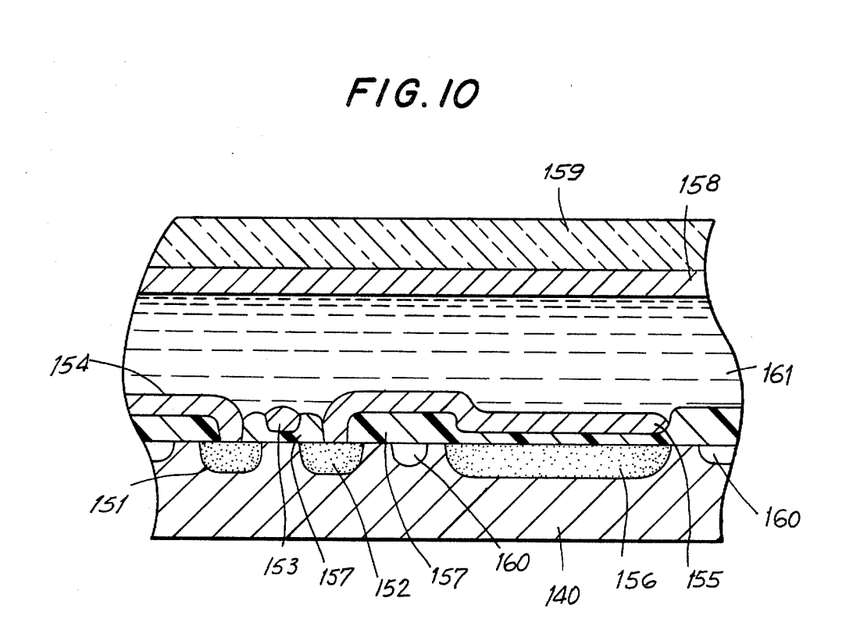
FIG. 10 is a partial sectional view of a liquid crystal display unit in accordance with this invention.

The picture element selecting transistors 6, capacitors 30, row and column signal lines, and similar portions of the matrix liquid crystal display unit are formed on a crystalline semi-conductor substrate. FIG. 10 is a sectional view of a semi-conductor substrate 140 forming the circuit of FIG. 4. In FIG. 10, reference numeral 154 denotes a row electrode, and reference numeral 151 indicates a diffusion area connected to the row electrode at the source of the transistor 6. A drain 152 for the transistor 6 comprises a diffusion area connected to a picture element electrode 155. Reference numeral 153 indicates a gate electrode for the transistor 6 and reference numeral 157 denotes an insulating layer having a reduced thickness below the gate portion 153 for the transistor 6. The insulating layer 157 also extends below the picture electrode 155. The electrode 31 on the capacitor 30 of FIG. 4 is produced by a diffusion layer 156. The display further includes the liquid crystal 161, a common transparent electrode 158 for the liquid crystal display unit, the common transparent electrode being formed on a surface of a glass 159 opposite to the picture element electrode 155. A common capacitor electrode for each row is formed by the diffusion layer 156 which is maintained and formed separately for each row. A stop 160 divides the diffusion layer 156 between every two adjoining rows. Because the common capacitor electrode 156 for each row is separated by the diffusion layer 160 having a high impurity content, as shown in FIG. 10, it is not necessary to provide any particular electrode as interconnecting wiring on the upper surface of the substrate 140, and the substrate surface can be maintained in the usual manner. Moreover, as the insulating layer 157 has a reduced thickness in the area of the picture element electrode 155, the capacitor is easily formed by ultizing the picture element electrode 155 and the diffusion layer 156 as the two opposed electrodes thereof.

Thus, it is possible to drive a matrix liquid crystal display circuit by alternating current using one half of the voltage hitherto required in an AC drive. Thereby a reduction in power consumption is achieved. This result is accomplished by connecting one of the capacitor electrodes on each liquid crystal picture element to a common line for each row of the matrix, and by progressively shifting the level of voltage potential on these capacitor electrodes. It is also possible to reduce by half the range of operating voltages required for the peripheral circuit device. Although this invention has been described with reference to FIGS. 4–6, it should be understood that modifications or variations within the scope and spirit of this invention may be easily accomplished by those skilled in the art.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid crystal display circuit comprising:
   a plurality of liquid crystal picture elements, said picture elements being arranged in a fixed pattern, each picture element having a picture element electrode and an opposed common electrode, the common electrodes of all said picture elements being connected to a common potential;
   means for selecting picture elements for display of an image signal, each said picture element electrode being connected to said means for selecting;
   a plurality of capacitors, one capacitor associated with each said picture element, one terminal of each said capacitor being coupled to the picture element electrode of the associated picture element, the other terminal of said capacitor being coupled to one of a plurality of common capacitor electrodes, a plurality of said capacitors being connected to every common capacitor electrode;
   voltage means, said voltage means being adapted to output a plurality of voltage levels, said voltage levels changing periodically, said common capacitor electrodes and said commonly connected capacitor terminals being connected periodically to the output of said voltage means, said changing voltage levels at said common capacitor electrodes providing an AC voltage on said picture element electrodes relative to said common picture electrodes at said common potential.

2. A liquid crystal display circuit as claimed in claim 1, wherein said fixed pattern includes rows and columns, said capacitors having electrodes connected to the same common capacitor electrode being connected to picture elements in the same row or column.

3. A liquid crystal display circuit as claimed in claim 1 or 2, wherein said means for selecting and said capacitors are formed on a monocrystalline semi-conductor substrate.

4. A liquid crystal display circuit as claimed in claim 3, wherein said means for selecting picture elements is an individual transistor connected to each picture element electrode.

5. A liquid crystal display circuit as claim in claim 1, wherein said means for selecting picture elements for display is adapted to operate on a plurality of image signals for display including a regular signal and an inverted signal and to apply to each picture element electrode alternately a sample of said regular and inverted signals, whereby said picture elements are driven with an AC signal.

6. An alternating current drive circuit for a liquid crystal display unit, said display unit being adapted for connection to a source of image signals, one of said image signals being inverted, comprising:
   a plurality of liquid crystal picture elements, said picture elements being arranged in a fixed pattern, each picture element having a picture element electrode;
   a picture element selecting transistor and a capacitor associated with each of said picture elements, and connected to the associated picture element electrode, said capacitors having first electrodes coupled to one of a plurality of common capacitor electrodes, a plurality of said capacitors being connected to every common capacitor electrode;
   means for selecting picture elements for display of said image signals, each said picture element electrode being connected periodically to said means for selecting through said associated transistor;
   a reference voltage source outputting a reference voltage, said reference voltage source being connected to every picture element at the electrode opposite to said picture element electrode;
   voltage means, said voltage means being adapted to output a plurality of voltage levels said voltage changing periodically, each said common capacitor electrode being connected in turn to the output of said voltage means, said periodic level change of said voltage means produces an AC signal across said picture element relative to said reference voltage.

7. The alternating current drive circuit as claimed in claim 6 wherein said fixed pattern includes rows and columns, said capacitors having electrodes connected to the same common capacitor electrode being connected to picture elements in the same row.

8. The alternating current drive circuit as claimed in claim 7 and further comprising an image system sampling circuit, and a row driving circuit, said sampling circuit sensing said image signals for driving each picture element periodically, said row driving circuit short circuiting the transistors in the row of the instantaneously driven picture element.

9. The alternating current drive circuit as claimed in claim 8, wherein the transistor is short-circuited for a period greater than the time of sampling each transistor.

10. The alternating current drive circuit as claimed in claim 8, wherein said transistors are P-channel MOSFETS, said periodically changing voltage level changing between a high potential and a low potential relative to said reference voltage, inversion from a high potential to a low potential taking place immediately after each said picture element in a row has been driven with an image signal sample, inversion from a low potential to a high potential occurring immediately before said image signals are provided to said selected row.

11. The alternating current drive circuit as claimed in claim 8, wherein said transistors are N-channel MOSFETS, said periodically changing the voltage level changing between a high potential and a low potential relative to said reference voltage, inversion from a low potential to a high potential taking place immediately after each said picture element in a row has been driven with an image signal sample, inversion from a high potential to a low potential occurring immediately before said image signals are provided to said selected row.

12. The alternating current drive circuit as claimed in claim 6, and further comprising a shift register having a plurality of stages in series, and periodic level changes of said voltage means for each row being the output of a different stage of said shift register.

13. The alternating current drive circuit as claimed in claim 12, wherein said shift register outputs said periodically changing level signals to said common capacitor electrodes for each row, and said signals from said row driving circuit for short circuiting said transistors.

14. The alternating current drive circuit as claimed in claim 6, wherein said image signals have a mutually overlapping voltage range.

15. The alternating current drive circuit as claimed in claim 6, wherein said capacitors have a capacity substantially greater than the inherent capacity of said picture elements whereby said periodically changing voltage levels produce said AC driving signals at said picture element electrodes.

16. The alternating current drive circuit as claim in claim 6, wherein said means for selecting and said capacitors are formed on a monocyrstalline semi-conductor substrate.

17. The alternating current drive circuit as claim in claim 8, and further comprising an image system sampling circuit, and a row driving circuit, said sampling circuit sensing said image signals for driving each picture element periodically, said row driving circuit short circuiting the transistors in the row of the instantaneously driven picture element.

18. A liquid crystal display circuit as claimed in claim 16, wherein said common capacitor electrodes comprise a diffusion layer formed in said semi-conductor substrate, said diffusion layer having a higher impurity content than said substrate.

* * * * *